(12) United States Patent
Dutu et al.

(10) Patent No.: US 12,204,774 B2
(45) Date of Patent: Jan. 21, 2025

(54) ALLOCATION OF RESOURCES WHEN PROCESSING AT MEMORY LEVEL THROUGH MEMORY REQUEST SCHEDULING

(71) Applicant: ADVANCED MICRO DEVICES, INC., Santa Clara, CA (US)

(72) Inventors: Alexandru Dutu, Bellevue, WA (US); Nuwan Jayasena, Santa Clara, CA (US); Yasuko Eckert, Redmond, WA (US); Niti Madan, Austin, TX (US); Sooraj Puthoor, Austin, TX (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 31 days.

(21) Appl. No.: 17/986,623

(22) Filed: Nov. 14, 2022

(65) Prior Publication Data

US 2024/0160364 A1   May 16, 2024

(51) Int. Cl.
*G06F 3/06* (2006.01)
(52) U.S. Cl.
CPC .......... *G06F 3/0625* (2013.01); *G06F 3/0659* (2013.01); *G06F 3/0673* (2013.01)
(58) Field of Classification Search
CPC ..... G06F 3/0625; G06F 3/0659; G06F 3/0673
See application file for complete search history.

(56) References Cited

U.S. PATENT DOCUMENTS

| | | | |
|---|---|---|---|
| 2012/0069034 A1* | 3/2012 | Biswas | G06F 9/5033 |
| | | | 711/170 |
| 2018/0188970 A1* | 7/2018 | Liu | G06F 3/0653 |
| 2021/0110876 A1* | 4/2021 | Seo | G06F 13/1668 |
| 2021/0182190 A1* | 6/2021 | Gao | G06F 12/0246 |
| 2022/0374166 A1* | 11/2022 | La Fratta | G06F 3/0673 |
| 2023/0115296 A1* | 4/2023 | Jaser | G06F 3/0659 |
| | | | 711/154 |

OTHER PUBLICATIONS

Kim et al., Thread Cluster Memory Scheduling: Exploiting Differences in Memory Access Behavior, 2010 43rd Annual IEEE/ACM International Symposium on Microarchitecture, IEEE, DOI: 10.1109/MICRO.2010.51, Date Added to IEEE Xplore: Jan. 20, 2011, 12 pages.

Mutlu et al., Stall-Time Fair Memory Access Scheduling for Chip Multiprocessors, 40th Annual IEEE/ACM International Symposium of Microarchitecture (MICRO 2007), Microsoft Research, IEEE, DOI: 10.1109/MICRO.2007.21, Date Added to IEEE Xplore: Dec. 26, 2007, 13 pages.

(Continued)

*Primary Examiner* — Aracelis Ruiz (57) ABSTRACT

An apparatus includes a memory controller that includes logic to receive a first memory request having a first request type and a second memory request having a second request type. The apparatus also includes a scheduling unit that includes logic to schedule an order of the first and second memory requests for execution based upon a first parameter value and a second parameter value. The first parameter value corresponds to a utility and energy cost for the first memory request and the second parameter value corresponds to a utility and energy cost for the second memory request.

20 Claims, 8 Drawing Sheets

(56) References Cited

OTHER PUBLICATIONS

Subramanian et al., The Application Slowdown Model: Quantifying and Controlling the Impact of Inter-Application Interference at Shared Caches and Main Memory, 2015 48th Annual IEEE/ACM International Symposium of Microarchitecture *Micro), IEEE, DOI: 10.1145/2830772.2830803, Date Added to IEEE Xplore: Feb. 16, 2017, 14 pages.

Zahedi et al., REF: Resource Elasticity Fairness with Sharing Incentives for Multiprocessors, ACM SIGPLAN Notices, vol. 49, Issue 4, URL: https://doi.org/10.1145/2644865.2541962, dated Apr. 2014, 15 pages.

* cited by examiner

ALLOCATION OF RESOURCES WHEN PROCESSING AT MEMORY LEVEL THROUGH MEMORY REQUEST SCHEDULING

BACKGROUND

Conventional computing systems typically include one or more processing units, such as a Central Processing Unit (CPU) or a graphics processing unit (GPU). Such processing units operate by retrieving instructions from memory (through memory requests sent to a memory controller over a memory bus), executing various operations, and storing the results of the executed operations in memory (through memory requests sent to the memory controller over the memory bus). Some computing systems additionally incorporate PIM (Processing-in-memory), in which execution of operations is offloaded from the processing unit to logic near or in the memory itself. In these PIM-enabled computing systems, PIM operations are triggered at memory through memory requests similar to those sent to memory by a conventional, non-PIM processing device.

In conventional computing systems without PIM, memory requests are scheduled at the memory controller level so as to balance or otherwise optimize utilization of memory resources. Conventional systems can use various metrics for such optimization, including, for example, number of requests received per second. These conventional systems without PIM may also prioritize memory requests that will have the shortest processing latency to minimize energy cost per request. However, in PIM-enabled systems that include a mix of non-PIM and PIM memory requests, these optimization goals and request scheduling techniques do not yield fair or energy efficient behavior.

BRIEF DESCRIPTION OF THE DRAWINGS

PIM-enabled memory supports performance of operations in or near memory storing data used in such operations. PIM-enabled memory improves computational efficiency by reducing data transfers as well as power consumption. Offloading operations that would otherwise be executed by a processor to PIM-enabled memory, for example, conserves bandwidth on a data link between the processor and the memory and reduces power consumption of the processor. The execution of operations in PIM-enabled memory does not require loading data into local registers of the processor nor writing data from the local registers back to the memory.

PIM-enabled memory is controlled by a processor which dispatches work to the PIM-enabled memory in the form of PIM requests. The PIM requests flow through the same interface as conventional memory requests and a memory controller is responsible for scheduling the PIM requests alongside conventional memory requests.

Some PIM requests execute across all or a set of banks of a channel of memory. Scheduling such PIM requests alongside regular memory requests is a non-trivial task. One can consider issuing a PIM request as soon as it becomes the oldest request in a memory controller's queue. However, a PIM request executes across all or a set of the banks in a channel and therefore performs more work compared to a conventional (e.g., non-PIM) memory request. Another approach, similar to the manner in which non-PIM memory writes are traditionally handled by a memory controller, is to consider issuing PIM requests in a burst, where the memory controller waits until a threshold number of PIM requests is queued before issuing those PIM requests sequentially. However, in situations in which PIM requests greatly outnumber non-PIM requests, there is a possibility that issuing PIM requests in bursts based on a fixed threshold will cause non-PIM requests to wait to be issued for a longer time than preferred. Additionally, the energy cost for servicing a PIM request varies based on a number of physical pages opened and closed across all or a set of the banks as result of servicing the PIM request. Carelessly issuing PIM requests when all or a set of the banks have one row already open may unnecessarily increase the energy cost of both PIM and non-PIM requests.

Previous approaches attempt to enhance scheduling of memory requests from multiple applications by defining fairness as equal stall time of memory requests and uses this heuristic when scheduling memory requests. However, using previously presented heuristics for memory scheduling has been shown to lead to unfair resource allocation and violation of quality-of-service (QoS) agreements of some applications. In addition, previous approaches are performed in the context of a system without PIM-enabled memory. A system with PIM-enabled memory has different scheduling considerations due to differences in fairness and energy costs between non-PIM memory requests and PIM memory requests. Implementations described herein consider the differences between PIM and non-PIM memory requests, and present a new memory request scheduling policy for a memory controller that takes into consideration the utility and the cost (in both time and power) of PIM and non-PIM requests when scheduling the PIM and non-PIM requests.

Implementations described herein address fairness when scheduling memory requests for PIM and non-PIM workloads while minimizing energy cost. In some implementations, hardware modifications to a memory controller ensure fair and energy conscious allocation of resources in a multi-tenancy environment. By doing so, PIM systems are efficiently shared in multi-tenancy environments such as supercomputers and data centers, where static partitioning of resources is detrimental to energy consumption and therefore operating cost. In one or more implementations, the cost of operating a supercomputer or data center is reduced by incentivizing sharing of resources through fair and energy-aware resource allocation.

Various implementations described herein include methods and apparatus for fair allocation of resources in systems that comprise multiprocessors (e.g., CPU, GPU, etc.) and PIM-enabled memory. An implementation achieves fairness in allocating memory resources by considering the differences between PIM and non-PIM workloads in various aspects. For example, PIM workloads bypass caches and share only memory bandwidth with other workloads, whereas non-PIM workloads share both caches and memory bandwidth. PIM requests work on multiple rows across all or a set of the banks within a channel whereas non-PIM requests work on just one row within one bank. PIM requests have an energy cost that is proportional to the number of open or closed rows in all or a set of the banks of a channel.

To address the differences between PIM and non-PIM requests, various implementations described herein provide for a method and apparatus to measure the utility and energy cost of different types of memory requests (e.g., PIM requests and non-PIM requests), and schedule the memory requests in a fair and energy-aware manner based on the measured utility and energy cost for each memory request.

As used herein, "scheduling" refers to the planning, coordinating, configuration and managing of operations related to scheduling PIM and non-PIM memory requests for execution within a PIM or non-PIM memory. While examples in this disclosure discuss the applicability of the implementations to PIM technology, such examples should not be construed as limiting.

Various apparatus and methods are disclosed for efficient resource allocation through memory request scheduling when processing at the memory level. In some implementations an apparatus includes a memory controller that comprises comprising logic to receive a first memory request having a first request type and a second memory request having a second request type. The apparatus also includes a scheduling unit that comprises logic to schedule an order of the first and second memory requests for execution based upon a first parameter value and a second parameter value. The first parameter value corresponds to a utility and energy cost for the first memory request and the second parameter value corresponds to a utility and energy cost for the second memory request. The first request type, in some implementations, is a PIM request type and the second request type is a non-PIM request type.

The scheduling unit also includes logic to determine the first parameter value based on a first utility value associated with the first memory request and a first energy cost value associated with the first memory request and determine the second parameter value based on a second utility value associated with the second memory request and a second energy cost value associated with the second memory request. The first parameter value is based on a ratio of the first utility value and the first energy cost value, and the second parameter value is based on a ratio of the second utility value and the second energy cost value.

The first utility value for the first memory request is determined based on a utility function using a combination of a plurality of resources associated with the first memory request. In some aspects, the first utility value is determined based on at least one of the first request type, a number of banks accessed by the first memory request, a memory bandwidth utilization associated with the first memory request, a cache utilization associated with the first memory request, and an interconnect utilization associated with the first memory request. In some aspects, the first energy cost value is determined based on at least one of the first request type, a number of banks accessed by the first memory request, a page state of a memory accessed by the first memory request, a number of open rows associated with the first memory request, and a number of closed rows associated with the first memory request.

The scheduling unit also comprises logic to store the first utility value and the second utility value in a utility history. In some aspects, the first utility value is stored in the utility history in association with a first thread identifier associated with the first memory request, and the second utility value is stored in the utility history in association with a second thread identifier associated with the second memory request.

The scheduling unit also includes logic to store the first energy cost value and the second energy cost value in an energy history. In some aspects, the first energy cost value is stored in an energy history in association with a first thread identifier associated with the first memory request, and the second energy cost value is stored in the energy history in association with a second thread identifier associated with the second memory request.

The scheduling unit also includes logic to schedule the first memory request before the second memory request for execution based upon the first parameter value being greater than or equal to the second parameter value. In some examples, the scheduling unit schedules the second memory request before the first memory request based upon the second parameter value being greater than the first parameter value. In some examples, the scheduling unit schedules the first memory request and the second memory request for concurrent execution based upon the first memory request not accessing a row.

This specification also includes descriptions of other apparatuses for efficient resource allocation through memory request scheduling that, instead of utility and energy cost, utilize switching cost to inform scheduling. Such an apparatus includes a memory controller that includes logic to receive a first memory request having a first request type and a second memory request having a second request type. The apparatus also includes a scheduling unit that includes logic to schedule an order of the first and second memory requests for execution based upon a switching cost. The switching cost is associated with one of switching from scheduling a memory request of the first request type to scheduling a memory request of the second request type, or switching from scheduling a memory request of the second request type to scheduling a memory request of the first request type. In some aspects the first request type is a PIM request type and the second request type is a non-PIM request type.

In some implementations, the scheduling unit also includes logic to determine a switching cost associated with one of switching from: scheduling a memory request of the first request type to scheduling a memory request of the second request type, or scheduling a memory request of the second request type to scheduling a memory request of the first request type. The scheduling unit schedules the order of the first and second memory requests for execution based upon the switching cost along with the first and second parameter values or, in the alternative, independently of the first and second parameter values.

Implementations described herein also include methods for allocating resources when processing at memory level. Such methods include receiving a first memory request having a first request type and receiving a second memory request having a second request type. The methods also include determining a first parameter value based on a first utility value associated with the first memory request and a first energy cost value associated with the first memory request and determining a second parameter value based on a second utility value associated with the second memory request and a second energy cost value associated with the second memory request. The method also includes scheduling an order of the first memory request and the second memory request for execution based upon the first parameter value and the second parameter value.

In some aspects, scheduling the order of the memory requests includes one of: scheduling the first memory request before the second memory request for execution based upon the first parameter value being greater than or equal to the second parameter value; and scheduling the second memory request before the first memory request for execution based upon the second parameter value being greater than the first parameter value. The first parameter value is based on a ratio of the first utility value and the first energy cost value, and the second parameter value is based on a ratio of the second utility value and the second energy cost value.

In some aspects, the method also includes determining a switching cost associated with one of switching from: scheduling a memory request of the first request type to scheduling a memory request of the second request type, or scheduling a memory request of the second request type to scheduling a memory request of the first request type. In such aspects, scheduling of the order of the first and second memory requests is also based upon the switching cost.

Figure 1:
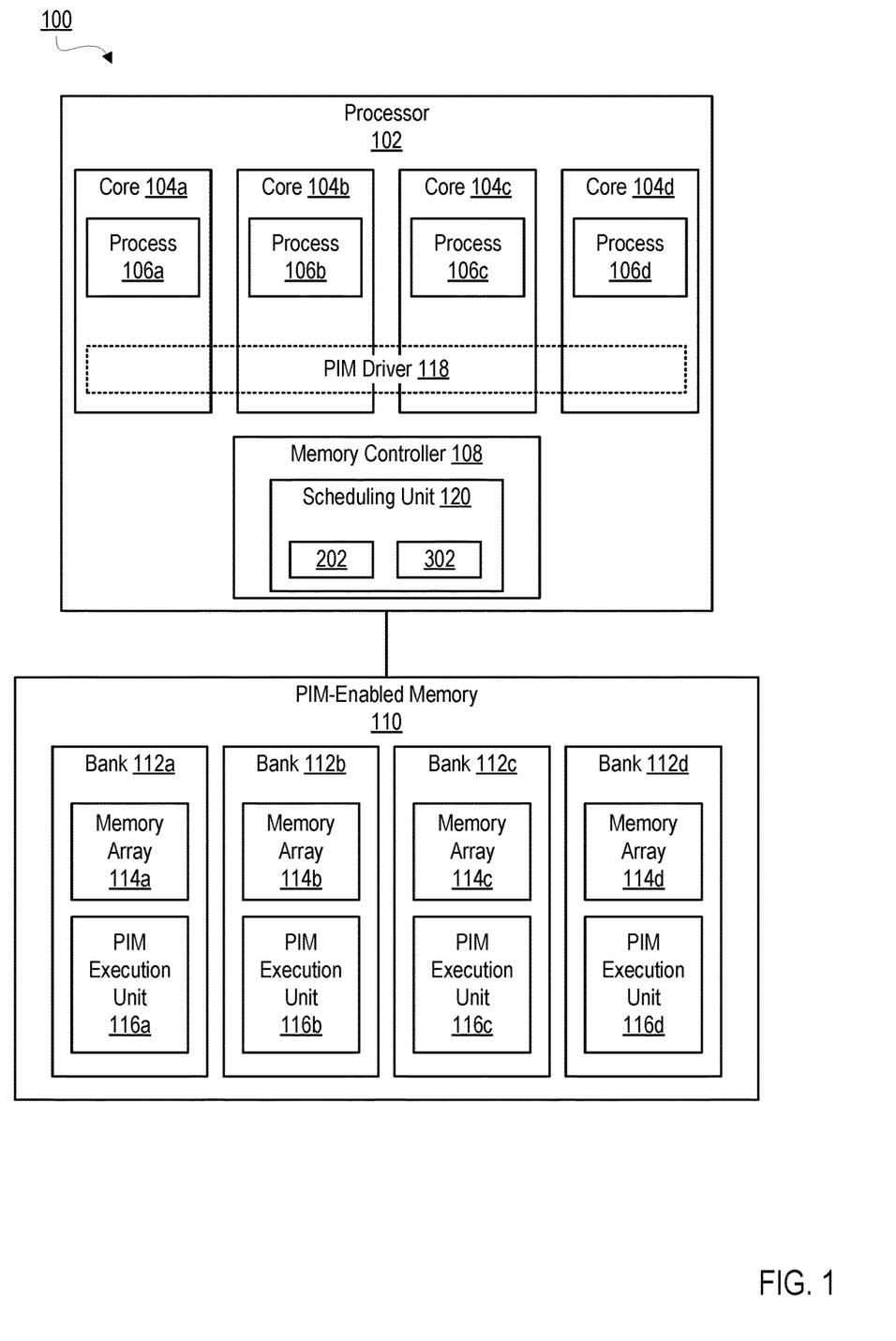
FIG. 1 sets forth a block diagram of an example system that includes PIM-enabled memory and a scheduling unit according to aspects described herein.

FIG. 1 sets forth a block diagram of an example system that includes PIM-enabled memory and a scheduling unit according to aspects described herein. The example system 100 of FIG. 1 depicts a processor 102 coupled to PIM-enabled memory 110. The processor 102 includes one or more processor cores 104a, 104b, 104c, 104d and a memory controller 108. The processor 102 of FIG. 1 is configured for multi-process execution. For example, each core 104a, 104b, 104c, 104d of the processor 102 executes a different process 106a, 106b, 106c, 106d of the same or a different application. As illustrated, processor core 104a executes process 106a, processor core 104b executes process 106b, processor core 104c executes process 106c, and processor core 104d executes process 106d. In various examples, the processor cores are CPU cores, GPU cores, or APU cores.

A GPU is a graphics and video rendering processing device for computers, workstations, game consoles, and the like. A GPU can be implemented as a co-processor component to the CPU of a computer. The GPU can be discrete or integrated. For example, the GPU can be provided in the form of an add-in card (e.g., video card), stand-alone co-processor, or as functionality that is integrated directly into the motherboard of the computer or into other devices.

The phrase accelerated processing unit (APU) is considered to be a broad expression. APU refers to any cooperating collection of hardware and/or software that performs those functions and computations associated with accelerating graphics processing tasks, data parallel tasks, nested data parallel tasks in an accelerated manner compared to conventional CPUs, conventional GPUs, software and/or combinations thereof. For example, an APU is a processing unit (e.g., processing chip/device) that can function both as a central processing unit ("CPU") and a graphics processing unit ("GPU"). An APU can be a chip that includes additional processing capabilities used to accelerate one or more types of computations outside of a general-purpose CPU. In one implementation, an APU can include a general-purpose CPU integrated on a same die with a GPU, a FPGA, machine learning processors, digital signal processors (DSPs), and audio/sound processors, or other processing unit, thus improving data transfer rates between these units while reducing power consumption. In some implementations, an APU can include video processing and other application-specific accelerators.

In an implementation, the processor cores 104a, 104b, 104c, 104d operate according to an extended instruction set architecture (ISA) that includes explicit support for PIM offload instructions that are offloaded to a PIM device for execution. Examples of PIM offload instruction include a PIM Load and PIM Store instruction among others. In another implementation, the processor cores operate according to an ISA that does not expressly include support for PIM offload instructions. In such an implementation, a PIM driver, hypervisor, or operating system provides an ability for a process to allocate a virtual memory address range that is utilized exclusively for PIM offload instructions. An instruction referencing a location within the aperture will be identified as a PIM offload instruction.

In the implementation in which the processor cores 104a, 104b, 104c, 104d operate according to an extended ISA that explicitly supports PIM offload instructions, a PIM offload instruction is completed by the processor cores when virtual and physical memory addresses associated with the PIM instruction are generated, operand values in processor registers become available, and memory consistency checks have completed. The operation (e.g., load, store, add, multiply) indicated in the PIM offload instruction is not executed on the processor core and is instead offloaded for execution on the PIM-enabled memory 110. Once the PIM offload instruction is complete in the processor core, the processor core issues a PIM command, operand values, memory addresses, and other metadata to the PIM-enabled memory 110. In this way, the workload on the processor cores 104a, 104b, 104c, 104d is alleviated by offloading an operation for execution to a PIM-enabled memory 110.

The PIM-enabled memory 110 of FIG. 1 includes a number of banks 112a, 112b, 112c, 112d. Each bank 112a, 112b, 112c, 112d includes a memory array 114a, 114b, 114c, 114d and a PIM execution unit 116a, 116b, 116c, 116d, respectively. Each PIM execution unit 116a, 116b, 116c, 116d can include various logic (not shown here) to carry out PIM operations. For example, a PIM execution unit can include logic for decoding instructions or commands issued from the processor cores 104a, 104b, 104c, 104d, a LIS (local instruction store) that stores a PIM instruction that is to be executed in the PIM-enabled memory, an ALU (arithmetic logic unit) that performs operations indicated in the PIM instructions, and a register file for temporarily storing data of load/store operations or intermediate values of ALU computations. In some examples, such an ALU is capable of performing a limited set of operations relative to ALUs (not shown) of a processor core 104a, 104b, 104c, 104d, thus making the ALU of the PIM execution unit less complex to implement and more suited for an in-memory implementation. A PIM instruction can move data between the registers of a PIM execution unit and memory of a memory array and a PIM instruction can trigger computation on this data in an ALU of the PIM execution unit.

As mentioned above, the processor 102 also includes at a memory controller 108 that is shared by the processor cores 104a, 104b, 104c, 104d. The memory controller 108 supports accessing the PIM-enabled memory 110. The memory controller 108 maintains one or more dispatch queues for queuing commands to be dispatched to the PIM-enabled memory 110.

In an implementation, a PIM driver 118 executed by the processor 102 aids in managing multi-process execution in the PIM-enabled memory 110. Process 106*a*, 106*b*, 106*c*, 106*d* can register with the PIM driver as a PIM process. To do so, the process provides a process identifier (PID) to the PIM driver 118 through a driver call. The PIM driver 118 registers the process as a PIM process by storing the PID and providing the PID to the memory controller 108.

The memory controller 108 also includes a scheduling unit 120. The scheduling unit 120 includes logic that is configured to carry out the scheduling of PIM memory requests and non-PIM memory requests according to aspects of the present disclosure. The scheduling unit 120 is configured to schedule PIM and non-PIM memory requests based on 1) the utility brought to an application and 2) the energy cost incurred by memory when servicing these requests at a current clock cycle. In an implementation, the scheduling unit 120 is located in the memory controller 108 which is close to memory. Because of this, computing the energy cost to service one request is performed with already available circuitry in a modern memory controller (e.g., by considering timing parameters of a specific DRAM protocol, number of rows accessed and the state of rows in all the banks). In an implementation, memory bandwidth utilization is computed for each memory request. However, considering only memory bandwidth when scheduling requests may render an unfair resource allocation among different applications because there are other shared resources in the system, and PIM and non-PIM applications have different demands for these resources. To better account for fairness when scheduling, instead of using only utilized memory bandwidth, the scheduling unit 120 uses a utility function that accounts for more shared resources, observed resource allocation, and the demand on those resources.

Figure 2:
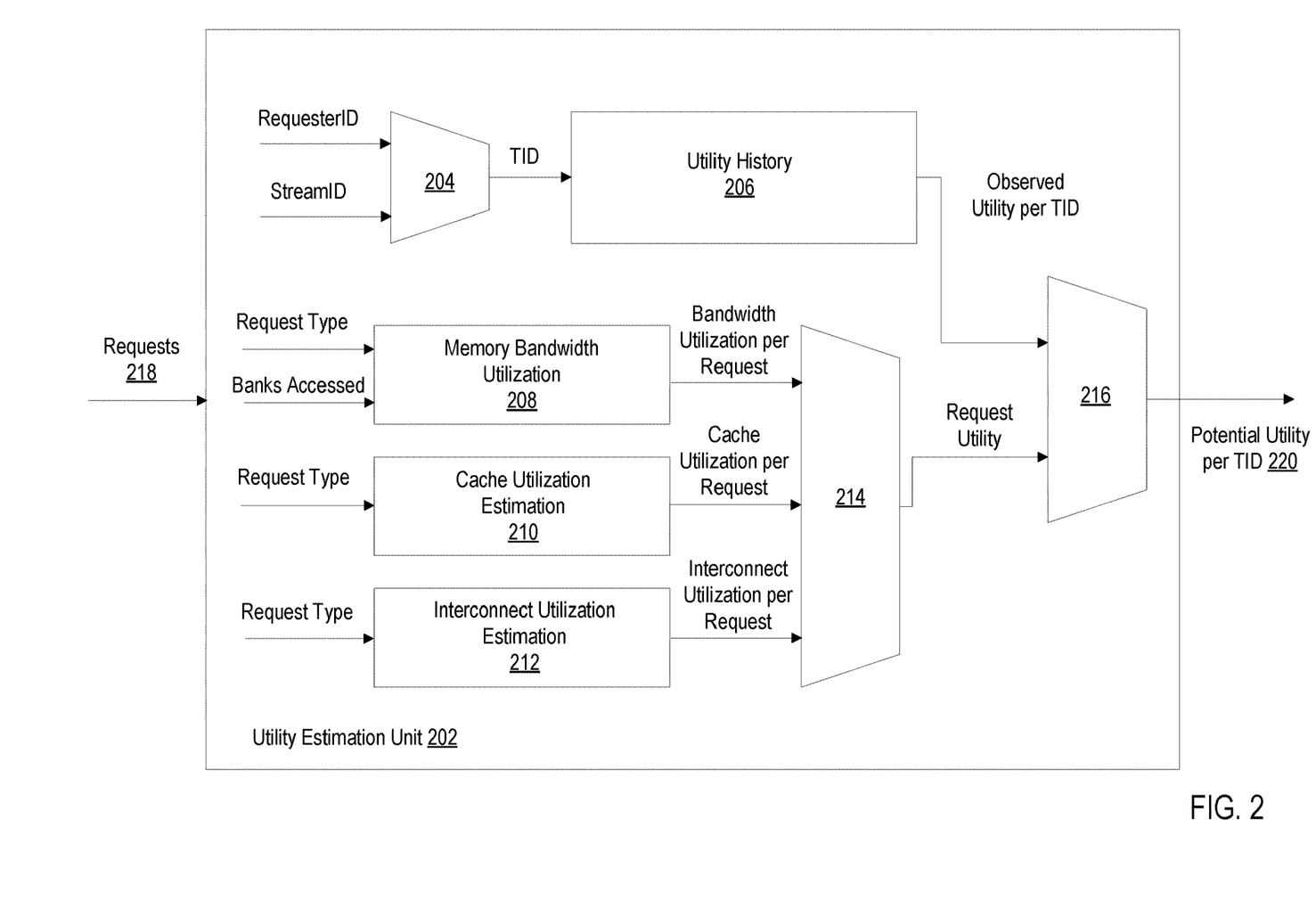
FIG. 2 sets forth a block diagram of an example utility estimation unit of a scheduling unit in accordance with the present disclosure.
Figure 3:
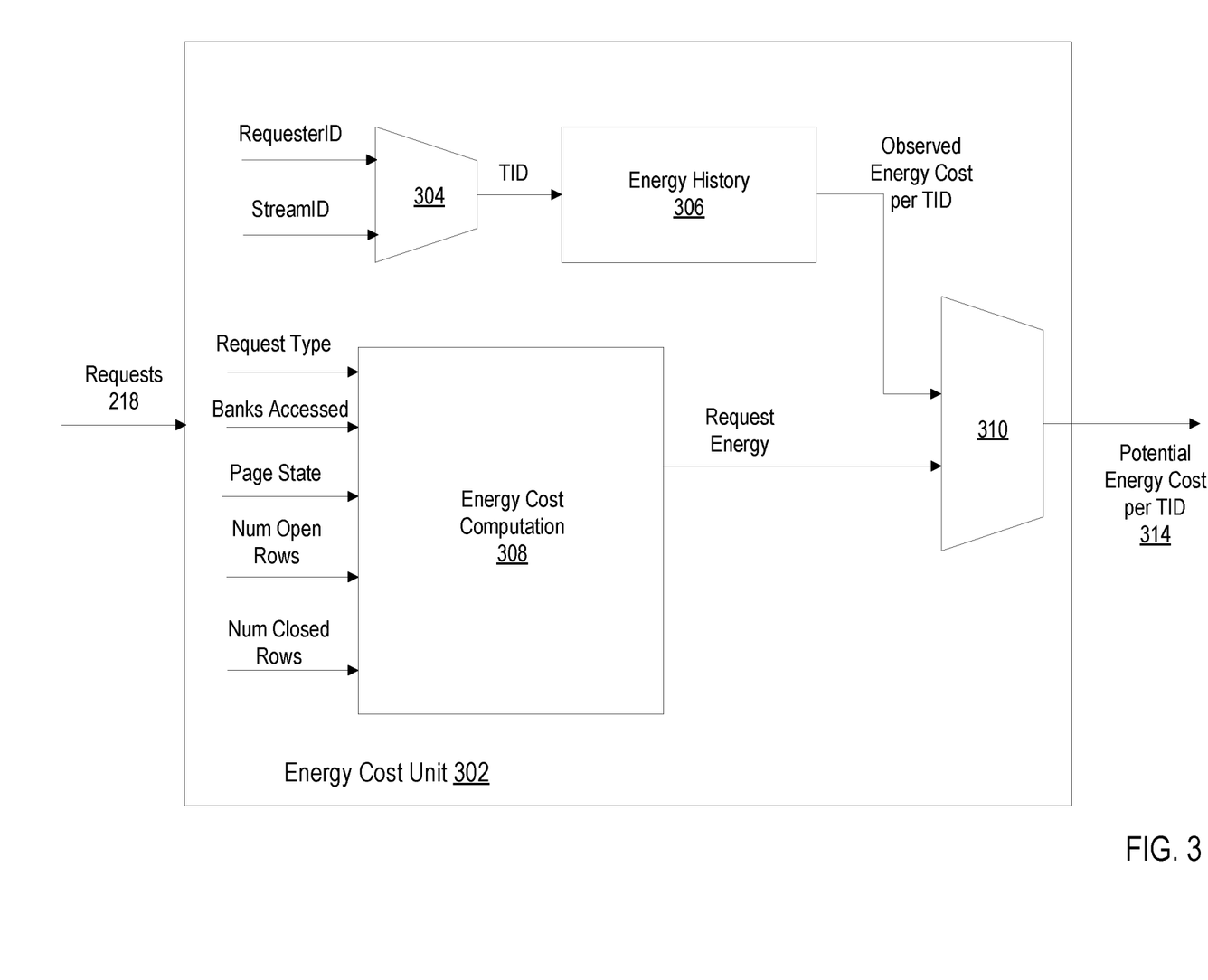
FIG. 3 sets forth a block diagram of an example energy cost unit of a scheduling unit in accordance with the present disclosure.

In an implementation, the scheduling unit 120 includes a utility estimation unit 202 for measuring/estimating the above-mentioned utility function at the memory controller level to account for fair scheduling of PIM and non-PIM memory requests. The utility estimation unit 202 determines a utility value for each serviced request. The scheduling unit 120 also includes an energy cost unit 302 to compute the energy cost of servicing a request. After measuring/estimating the potential utility and energy cost of a number of memory requests that include both PIM requests and non-PIM requests, the scheduling unit 120 uses these results to schedule the order of execution of the PIM requests and non-PIM requests as further described herein.

The PIM-enabled memory of FIG. 1 is one example in which one or more PIM execution units are included as components of the memory. In some examples, a PIM execution unit can be implemented as a component that is separate from and coupled to memory. Such an implementation is often referred to as Processing-Near-Memory (PNM). The term PIM, herein, is used to refer to either implementation in which PIM execution units are components of memory and implementations in which PIM execution units are components separate from memory, but are coupled to memory. Aspects of scheduling PIM and non-PIM requests as disclosed herein can be applied to all such implementations.

In some examples, a PIM-enabled memory is included in a system along with the processor. For example, a system on a chip may include a processor and the PIM enabled memory. As another example, a processor and PIM-enabled memory are included on the same PCB (Printed Circuit Board). In other aspects, a PIM-enabled memory can be a component that is remote with respect to the processor. For example, a system-on-chip, FPGA (Field Programmable Gate Array), or ASIC (Application Specific Integrated Circuit) may implement the processor which is separate from the PIM-enabled memory.

PIM-enabled memory may be implemented as DRAM. In some examples, the PIM-enabled memory is a double data rate (DDRx) memory, graphics DDRx (GDDRx) memory, low power DDRx (LPDDRx) memory, high bandwidth memory (HBM), hybrid memory cube (HMC), or other memory that supports PIM.

For further explanation, FIG. 2 sets forth a block diagram of an example utility estimation unit 202 in accordance with the present disclosure. The utility estimation unit 202 is a component of the scheduling unit in some implementations. The utility estimation unit 202 includes a thread identifier (TID) determination component 204, a utility history 206, a memory bandwidth utilization component 208, an interconnect utilization estimation unit 212, a request utility determination unit 214, and a potential utility determination unit 216. The utility estimation unit 202 is configured to measure or estimate a utility function at the memory controller level to determine a utility value of different PIM requests and non-PIM requests to account for fair scheduling of PIM and non-PIM applications.

Modern computing systems send requests to memory by generating packets through the memory hierarchy. These packets often include the ID of the requester (RequesterID) and of the stream that generated the request (StreamID) in order to identify the destination for the response packet from memory. The utility estimation unit 202 is configured to receive one or more memory requests 218 from a host processor. The TID determination component 204 uses the RequesterID and StreamID to construct a TID and associate a request with a TID. The utility estimation unit 202 produces a utility value for each serviced request and caches the utility values for all active threads produced by servicing requests from those threads in the utility history 206. Based on the request type for the request (i.e., either a PIM or non-PIM request) and the number of memory banks accessed by the request, the utility estimation unit 202 estimates the per-request utilization of shared resources and computes a potential utility per TID 220 if the input request is scheduled by the memory controller. If the request eventually gets picked for scheduling, the utility history 206 is updated with the potential utility of the associated TID.

Various implementations consider different mechanisms for determining the potential utility per TID depending on the system-required accuracy of the utility. For example, if memory bandwidth is the only shared resource considered, the memory bandwidth utilization component 208 is configured to measure the memory bandwidth used by each application and compute or approximate the utility function for that workload based on the request type (e.g., PIM or non-PIM) and number of banks accessed to determine a bandwidth utilization per request. If more accuracy is required, cache size and interconnect bandwidth are considered shared resources. In an implementation, the cache utilization estimation component 210 is configured to estimate a cache utilization per request based on the request type, and the interconnect utilization estimation unit 212 is configured to estimate an interconnect utilization per request based on the request type.

In some implementations, the utilized cache capacity is estimated based on the number of requests the memory controller receives from one workload and their arrival rate. Similarly, in some implementations, on-chip interconnect bandwidth utilization is tracked by the interconnect by examining the number of requests received by the interconnect and their arrival rate and embedding this information into the request to inform the memory controller.

In various implementations, the request utility determination unit 214 determines a request utility for a request based on one or more of the bandwidth utilization per request, the cache utilization per request, and the interconnect utilization per request. The potential utility determination unit 216 determines the potential utility per TID 220 based on an observed utility per TID obtained from the utility history 206 and the request utility determined by the request utility determination unit 214.

For further explanation, FIG. 3 sets forth a block diagram of an example energy cost unit in accordance with the present disclosure. The energy cost unit 302 is a component of the scheduling unit in some implementations. The energy cost unit 302 includes a thread identifier (TID) determination component 304, an energy history 306, an energy cost computation unit 308, and a potential energy cost per TID determination unit 310. The energy cost unit 302 is configured to receive one or more memory requests 218 from a host processor. The TID determination component 304 uses the RequesterID and StreamID obtained from the request to construct a thread ID and associate a request with a thread ID. The energy cost unit 302 is configured to compute an energy cost of servicing a request and store the energy consumed by servicing past requests for a thread in the energy history 306. The energy cost computation unit 308 receives the request type of the request, the number of banks accessed by the request, the page state, the number of open rows, and the number of closed rows to compute the energy cost associated with the request. The potential energy cost per TID determination unit 310 receives an observed energy cost per TID and the energy cost of the request and computes a potential energy cost per TID 314.

Modern computing systems already track the state of recently accessed pages. Therefore, in an embodiment, the energy of servicing a non-PIM request is computed based on the state of the page being accessed by the request. Given that PIM requests can access multiple banks, computing the energy cost of a PIM request is performed by counting the number of conflicts (e.g., a different row being opened than the one being accessed) and misses (e.g., the row to be accessed is closed) in the accessed banks. In an implementation, both the utility and energy history are reset when an epoch of a fixed number of cycles has passed. When calculating bandwidth utilization and energy cost per request, various implementations consider the fundamental differences between PIM and non-PIM requests as further discussed below.

Figure 4:
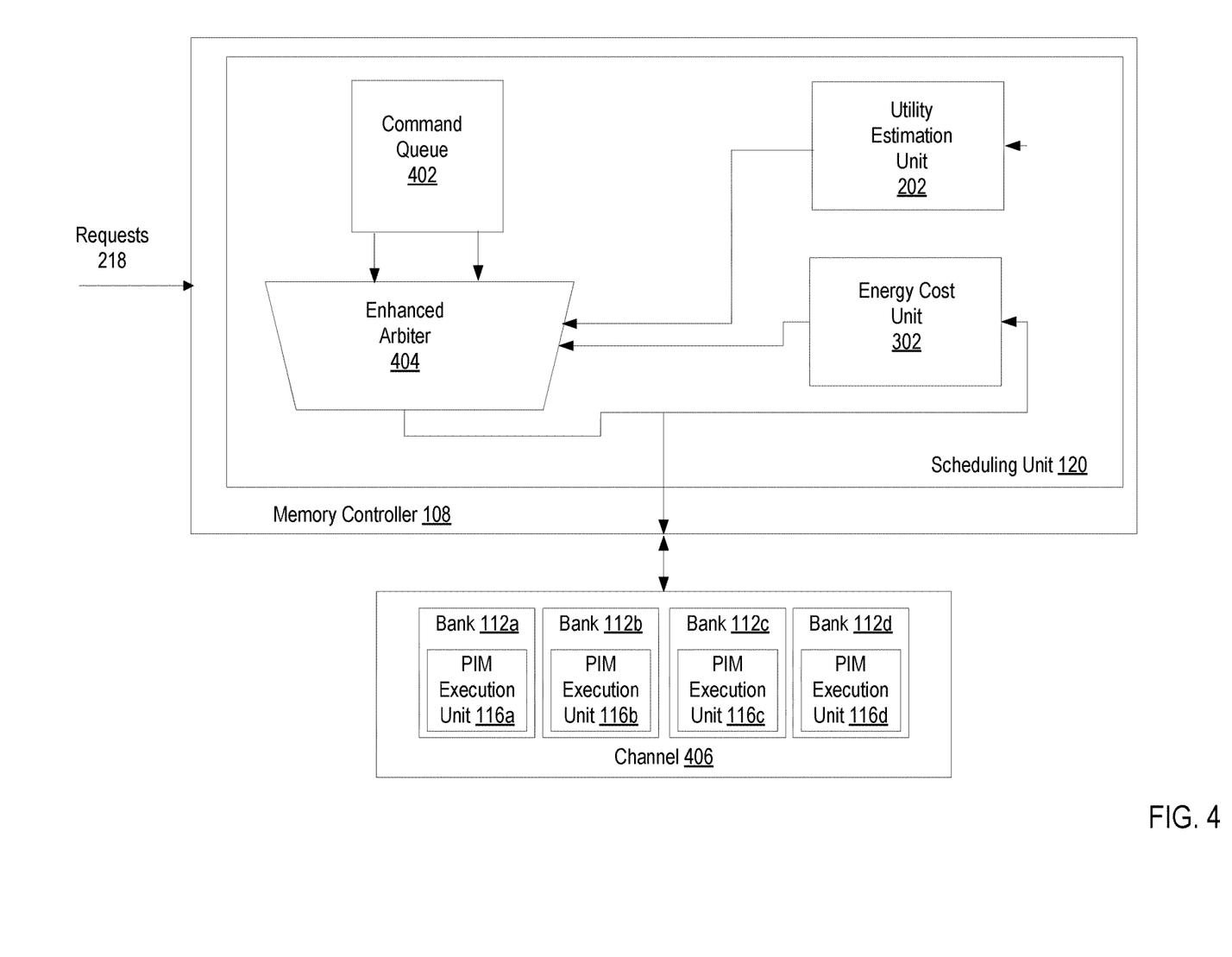
FIG. 4 sets forth a block diagram of an example scheduling unit of a memory controller in accordance with the present disclosure.

FIG. 4 sets forth a block diagram of an example scheduling unit 120 of a memory controller 108 in accordance with the present disclosure. The scheduling unit 120 includes a command queue 402, the utility estimation unit 202, the energy cost unit 302, and an enhanced arbiter 404. The memory controller 108 is in communication with a channel 406 of memory that includes a number of memory banks 112a, 112b, 112c, 112d, with each memory bank including a PIM execution unit 116a, 116b, 116c, 116d. The utility estimation unit 202 previously described with respect to FIG. 4 and the energy cost unit 302 previously described with respect to FIG. 5 measure or estimate the potential utility and energy-cost of a thread if a request is scheduled to be serviced by memory. The enhanced arbiter 404 utilizes the potential utility obtained from the utility estimation unit 202 and the energy cost obtained from energy cost unit 302 to schedule PIM requests and non-PIM requests.

An implementation considers PIM requests that access all the banks in a channel or a subset of banks, specified through a mask operand. To account for the energy cost of individual PIM requests, the energy cost unit 302 efficiently determines how many rows are opened or closed in the accessed banks and estimates the energy cost of scheduling a PIM request at a particular cycle based on the number of rows affected by an all-bank precharge and activate command. Therefore, the utility and energy cost of a PIM request is proportional to the number of banks accessed. In contrast, the energy cost of a non-PIM request can vary only based on the state of the one physical page (row) accessed.

It should be noted that a PIM request without row access can be scheduled simultaneously with another non-PIM request that is accessing rows. This implementation assumes there are separate command busses for PIM and non-PIM requests. However, other implementations have one command bus shared between the two types of requests. These systems allow PIM requests without row access and non-PIM requests to be serviced concurrently by memory, even if the memory commands for these requests will be sent sequentially over one command bus.

In an implementation, the enhanced arbiter 404 will schedule PIM requests in order of their arrival and non-PIM requests can be scheduled out of order. The enhanced arbiter will choose only a PIM request without row access if the utility-cost ratio of the PIM request is greater than or equal to the utility-cost ratio of other non-PIM requests ready to be scheduled. The enhanced arbiter will choose only a non-PIM request if the utility-cost ratio of the non-PIM request is greater than the utility-cost ratio of the oldest PIM. The enhanced arbiter will choose both a PIM request and a ready non-PIM request, when the PIM request does not access a row (i.e., register-only PIM request).

In an implementation, when picking a non-PIM request after a PIM request, it is observed that the energy cost is higher than when picking a PIM request after a PIM request to the same row. This is because the PIM-to-non-PIM sequence requires precharging rows in all or a subset of the banks and activating one row, whereas the PIM-to-PIM sequence does not. In an implementation, the arbiter correctly handles this case by considering the energy cost across all or a subset of the banks every time a PIM request is considered for scheduling or has been previously scheduled. In an implementation, determining open or closed rows in all or a subset of banks may utilize known approaches for tracking the status of rows or pages. In other implementations, more advanced optimizations are utilized in which predictions are made regarding open or closed rows based on the current utility-energy-cost ratio.

After a request is picked for scheduling, the utility and energy cost of its associated application is updated in the utility history 206 of the utility estimation unit 202 and the energy history 306 of the energy cost unit 302, respectively. It should be noted some implementations can extend the memory controller in modern computing systems by adding the utility estimation unit, the energy cost unit, and modifying the arbiter with the scheduling policy described with respect to various implementations. In one or more other implementations, the arbiter is redesigned to account for the scheduling policies described herein. In other implementations, logic implementing the scheduling policy is added as a last stage of the arbiter, after a non-PIM request winner has been selected by existing circuitry and the last stage arbitrates between PIM and non-PIM requests.

In various implementations, the utility estimation unit 202 and energy cost unit 302 utilize either more sophisticated or more simplistic approaches to estimate utility and energy costs for PIM and non-PIM requests. For example, in an implementation the utility estimation unit 202 learns from the utility history 206 and predicts future potential utility brought by the application, which impacts future scheduling decisions. In an implementation in a system in which power consumption is not an important consideration, the cost unit only considers the time it takes to service a request as a cost, rather than time and power as provided by energy cost unit 302.

One or more implementations operate in an environment in which fairness is considered to be equal allocation of resources among active applications (e.g., PIM and non-PIM). However, in other implementations a user is provided with the ability to inform the scheduling unit 120 with an unequal weighting of allocation of shared resources, and the scheduling unit 120 efficiently schedules requests based on these demands.

Figure 5:
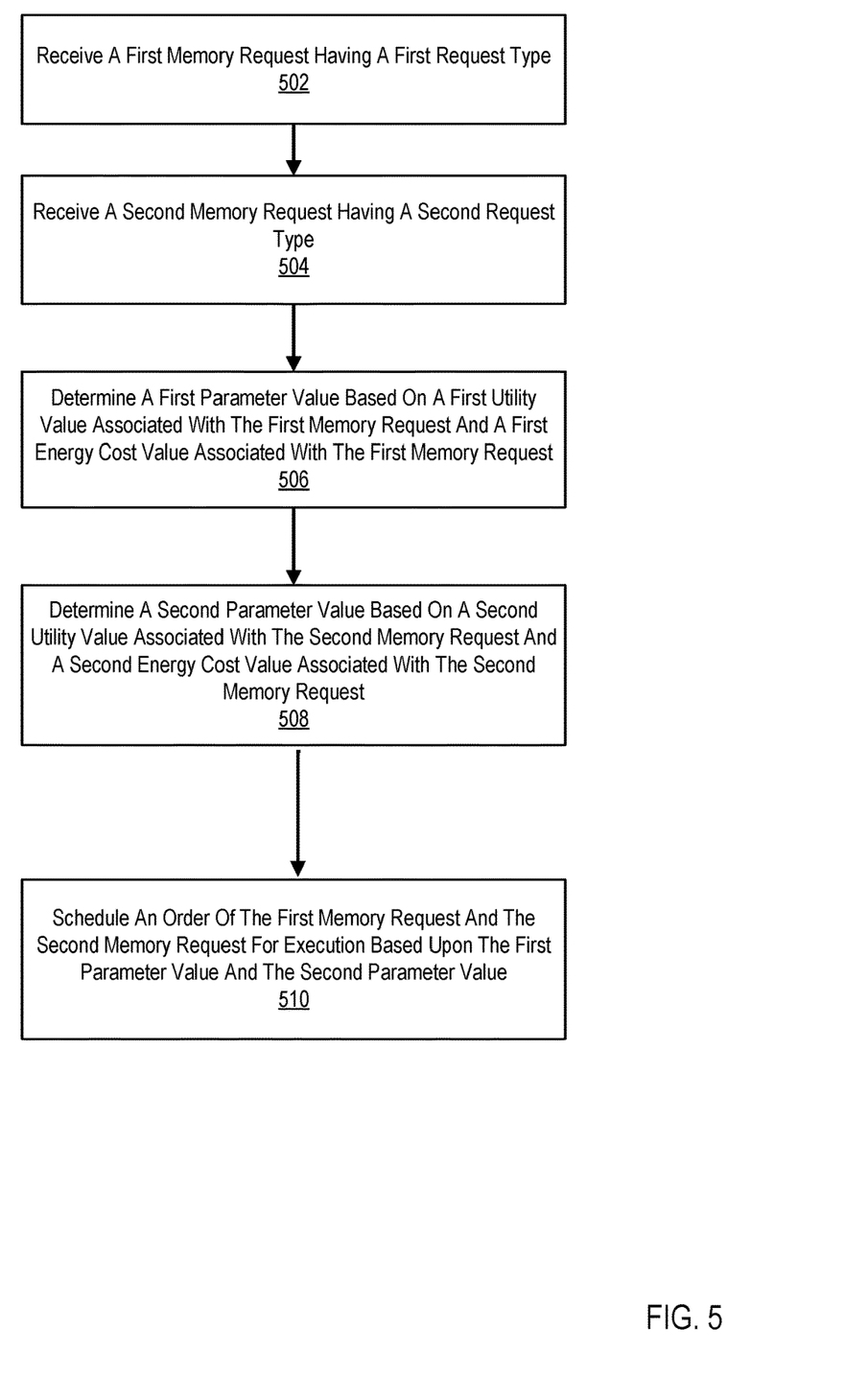
FIG. 5 sets forth a flow chart illustrating an example method for allocating resources when processing at memory level according to some implementations of the present disclosure.

For further explanation, FIG. 5 sets forth a flow chart illustrating an example method for allocating resources when processing at memory level. In an implementation, the method of FIG. 5 is carried out by a memory controller. The method of FIG. 5 includes receiving 502 a first memory request having a first request type, and receiving 504 a second memory request having a second request type. In an implementation, the first memory request and the second memory request are received from a host processor. In an implementation, the first request type is a PIM request type and the second request type is a non-PIM request type.

The method of FIG. 5 further includes determining 506 a first parameter value based on a first utility value associated with the first memory request and a first energy cost value associated with the first memory request. The method of FIG. 5 further includes determining 508 a second parameter value based on a second utility value associated with the second memory request and a second energy cost value associated with the second memory request. In an implementation, the first parameter value is based on a ratio of the first utility value and the first energy cost value, and the second parameter value is based on a ratio of the second utility value and the second energy cost value.

The first utility value for the first memory request is determined based on a utility function using a combination of a plurality of resources associated with the first memory request. Similarly, the second utility value for the second memory request is determined based on a utility function using a combination of a plurality of resources associated with the second memory request. In an implementation, the utility values are determined based on at least one of the request type, a number of banks accessed by the memory request, a memory bandwidth utilization associated with the memory request, a cache utilization associated with the memory request, and an interconnect utilization associated with the memory request.

The energy cost values for each memory request are determined based on at least one of the request type, a number of banks accessed by the memory request, a page state of a memory accessed by the memory request, a number of open rows associated with the memory request, and a number of closed rows associated with the memory request.

The first utility value and the second utility value are stored in a utility history. In an implementation, the first utility value is stored in the utility history in association with a first thread identifier associated with the first memory request, and the second utility value is stored in the utility history in association with a second thread identifier associated with the second memory request. The first and second energy cost values are stored in an energy history in association with a thread identifier associated with the memory request.

The method of FIG. 5 also includes scheduling 510 an order of the first memory request and the second memory request for execution based upon the first parameter value and the second parameter value. In implementations in which the first parameter value is greater than or equal to the second parameter value, the first memory request is scheduled before the second. In implementations in which the second parameter value is greater than the first parameter value, the second memory request is scheduled before the first. In another implementation, scheduling the order of the first memory request and the second memory request for execution includes scheduling the first memory request and the second memory request for concurrent execution based upon the first memory request not accessing a row. When not accessing a row, the first memory request does not compete for resources with the second memory request and thus can be scheduled concurrently to the second request.

Figure 6:
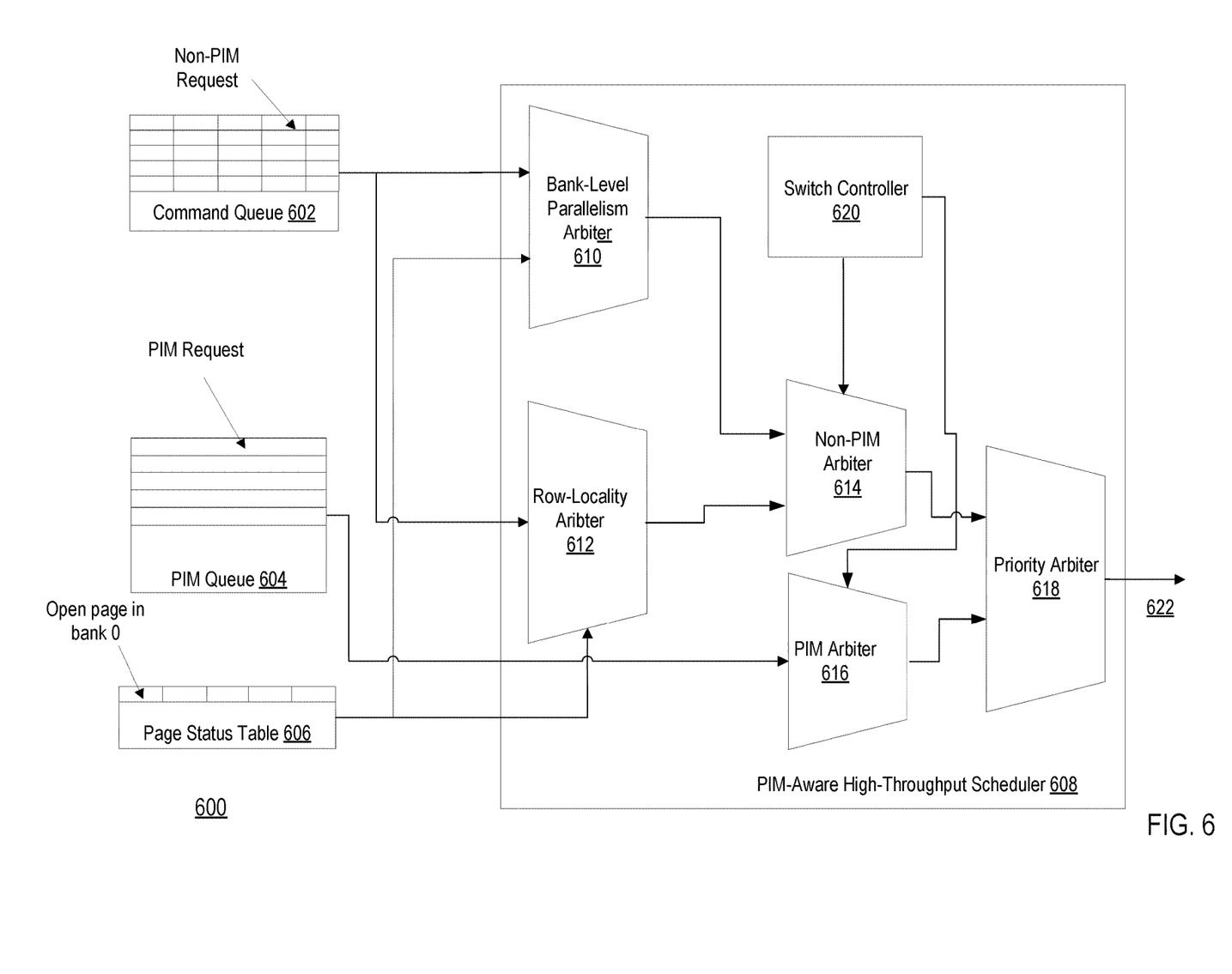
FIG. 6 sets forth a block diagram of another example scheduling unit of a memory controller in accordance with the present disclosure.

The examples above generally are directed to optimized memory request scheduling based on energy cost and utility. Memory throughput is another metric that can be utilized to inform scheduling of a memory requests as well. FIG. 6 sets forth a block diagram of an example scheduling unit 600 of a memory controller that includes logic for high-throughput scheduling in accordance with the present disclosure. The scheduling unit 600 includes a command queue 602, a PIM queue 604, a page status table 606 and a PIM-aware high-throughput scheduler 608. The PIM-aware high-throughput scheduler 608 includes a bank-level parallelism arbiter 610, a row-locality arbiter 612, a non-PIM arbiter 614, a PIM arbiter 616, a priority arbiter 618, and a switch controller 620.

Computing systems with capabilities of PIM are explicit about bank-level parallelism since PIM requests are multi-bank requests. PIM devices introduce new types of memory requests that execute across all or a set of the banks of a channel. However, these systems can incur great penalties in memory throughput if not carefully scheduled with the in-flight non-PIM requests. Scheduling these requests alongside regular DRAM memory requests is a non-trivial problem. One can consider issuing a PIM request as soon as it becomes the oldest request in the memory controller queue. However, a PIM request executes across all or a set of the banks in a channel and therefore incurs a high-performance cost when switching from a non-PIM request to a PIM request and vice versa. Another approach, similar to how DRAM writes are handled by a memory controller, is to consider issuing PIM requests in a burst, where the memory controller waits until a threshold number of PIM requests is queued before issuing those PIM requests sequentially. However, the number of PIM requests in a burst should be adjusted dynamically such that other non-PIM applications are not starved. PIM requests issued in a burst with no regard to non-PIM requests may cause the PIM requests to wait for a relatively long period of time. This is so when the number of non-PIM requests received is relatively low compared to the number of PIM requests. In such a scenario, it is possible that the PIM request will be issued in burst after burst while a non-PIM request waits a very long time (until a threshold number of non-PIM requests are received and the non-PIM requests can be issued in a burst). Additionally, the cost for servicing a PIM request can vary based on the number of physical pages opened and closed across all or a set of the banks. Carelessly issuing PIM requests when all or a set of the banks have one row already open may unnecessarily increase the cost of both PIM and non-PIM requests and consequently decrease memory throughput. One or more implementations address this performance problem when scheduling PIM and non-PIM memory requests.

One or more implementations herein describe a memory scheduler that is aware of PIM requests by carefully considering the time cost (e.g., performance penalty) when switching for a previously serviced non-PIM request to a PIM request and vice versa. To this end, one or more implementations provide a scheduling policy for a memory controller that minimizes the switching cost such that memory throughput is enhanced. One or more implementations provide for an efficient and practically realizable scheme to switch between PIM requests and non-PIM requests at the memory controller to ensure high throughput when both PIM and non-PIM requests need to be serviced. High memory throughput is achievable by considering the differences between PIM requests and non-PIM requests including the innate parallelism of PIM requests and the performance cost of switching. PIM requests work on multiple rows across all or a set of banks within a channel whereas non-PIM requests work on just one row within one bank. In addition, the performance cost of switching from non-PIM requests to PIM requests is proportional to the number of open and closed rows in all or a set of banks of a channel. The performance cost of switching from PIM requests to non-PIM requests is proportional to the bank-level parallelism of the non-PIM requests that follow PIM requests.

One or more implementations address the differences between PIM requests and non-PIM requests and maintain a high memory throughput by providing a method and apparatus to create a optimal or near-optimal schedule of PIM requests and non-PIM requests. Such methods and apparatus schedule non-PIM requests and PIM requests based on their respective switching costs.

Referring again to FIG. 6, the command queue 602 is configured to store non-PIM requests received by the memory controller and the PIM queue 604 is configured to store PIM requests received by the memory controller. The page status table 606 stores information indicative of the open/close status of rows in a memory bank. The bank-level parallelism arbiter 610 and row-locality arbiter 612 are configured to provide non-PIM requests to the non-PIM arbiter. The PIM arbiter 616 is configured to receive PIM requests from the PIM queue 604. The switch controller 620 is configured to switch between the non-PIM arbiter sending non-PIM requests to the priority arbiter 618 and the PIM arbiter 616 sending PIM requests to the priority arbiter 618. The priority arbiter is configured to send one or more scheduled memory requests 622 (either non-PIM or PIM-requests) based upon a priority associated with the memory request.

One or more implementations measure switching cost in two situations: 1) when switching from non-PIM request to PIM requests and 2) when switching from PIM requests to non-PIM requests. In case of non-PIM-to-PIM switching, one or more implementations keeps track of the number of rows open in different banks. Keeping track of the number of rows open can be carried out using a counter that is incremented when a new row in a different bank is only opened by a request and decremented as a row is only closed by a request. Modern memory controllers typically track the opened rows. In an implementation, the structure that tracks the opened rows is enhanced to count the number of open rows in different banks. In other implementations, the structure(s) that holds the memory requests (PIM and non-PIM) is enhanced to extract bank-level parallelism for non-PIM requests. For example, modern memory controllers check address dependencies when a non-PIM request is pushed into the command queue 602. An enhanced version of the command queue 602 groups together independent non-PIM requests. Scheduling a set of independent non-PIM requests to be serviced concurrently by memory achieves high bank-level parallelism.

Figure 7:
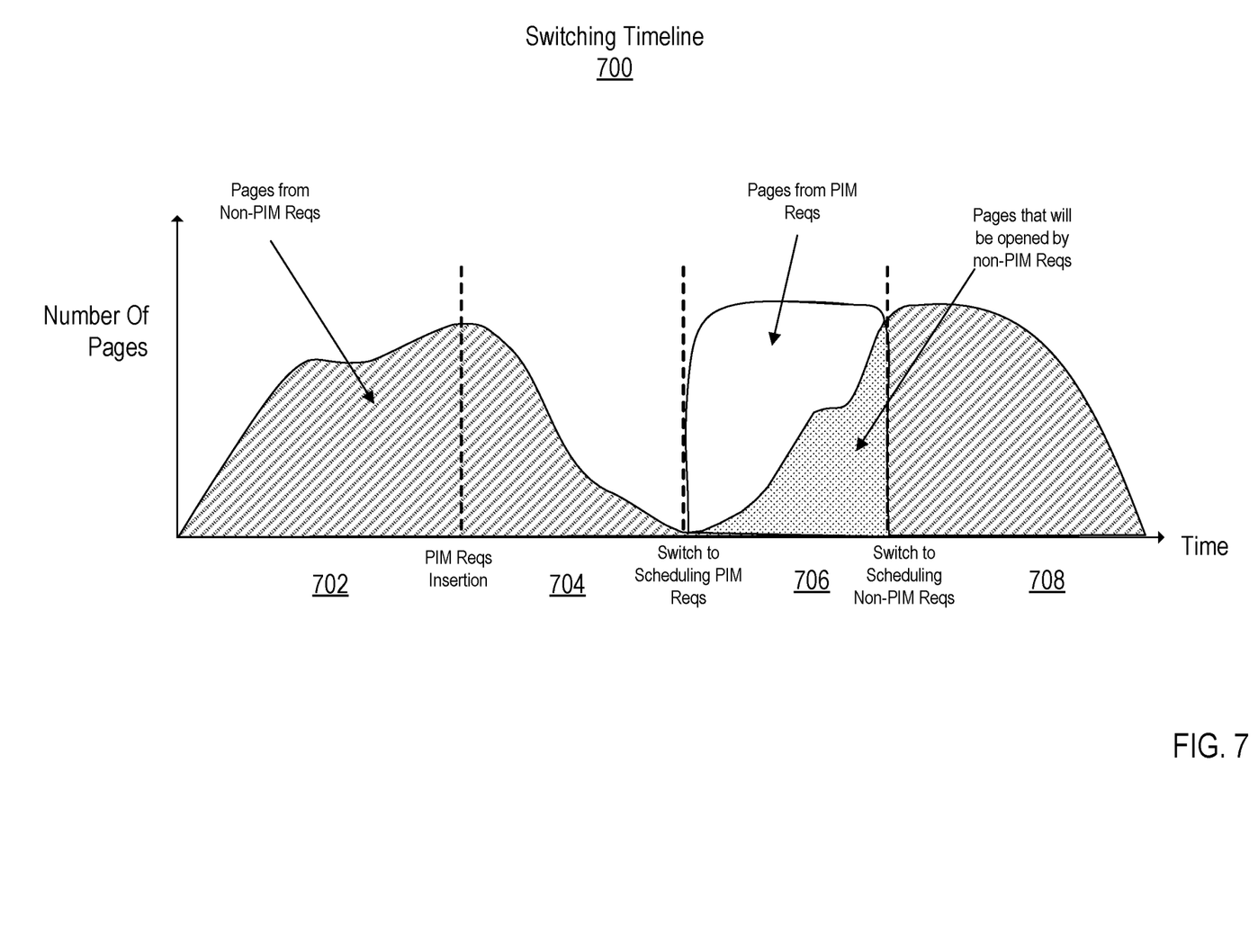
FIG. 7 sets forth a timeline of an example cost of switching from non-PIM requests to PIM requests and vice versa.

FIG. 7 sets forth a timeline 700 of an example cost of switching from non-PIM requests to PIM requests and vice versa. The vertical axis represents the number of pages opened and closed due to each operation. In a first time period 702, the number of pages from non-PIM requests increases over time. In a second time period 704, during a period of PIM request insertion, the number of open pages from non-PIM requests decreases. In a third time period 706 after switching from scheduling non-PIM requests to PIM requests, the number of pages from PIM request and the number of pages that will be opened by non-PIM requests increases. In a fourth time period 708, a switch from scheduling PIM request to non-PIM requests is initiated. During the fourth time period 708, the pages from non-PIM requests are initially high and decrease over time.

Referring back again to FIG. 6, in an implementation the scheduling unit 600 implements a scheduling policy that considers the cost of switching from non-PIM requests to PIM requests and vice versa. Switching to a PIM request incurs a high cost if multiple pages are already open and switching to non-PIM requests, from PIM requests, can incur a high cost if there are not many independent non-PIM requests to be serviced. In an implementation, the scheduling unit 600 stops opening new non-PIM pages after the arrival of PIM requests at the memory controller. The scheduling unit then prioritizes servicing non-PIM requests to already opened pages and closes them as those non-PIM requests are retired. The scheduling unit switches to scheduling PIM requests when either there are no non-PIM pages opened, or when a PIM bypass counter reaches a certain value, and the priority of PIM requests is escalated. Once switched, the scheduling unit proceeds to schedule PIM requests until switching back to scheduling non-PIM requests. The switch back to scheduling non-PIM requests occurs when, either a maximum number of independent non-PIM requests to different banks have been queued, or when a non-PIM bypass counter reaches a certain value, and the priority of non-PIM requests is escalated. The bypass counters ensure that neither type of request is starved. That is, the bypass counter is incremented with every cycle a request spends queued and the priority of a request is increased when the bypass counter reaches certain thresholds.

Figure 8:
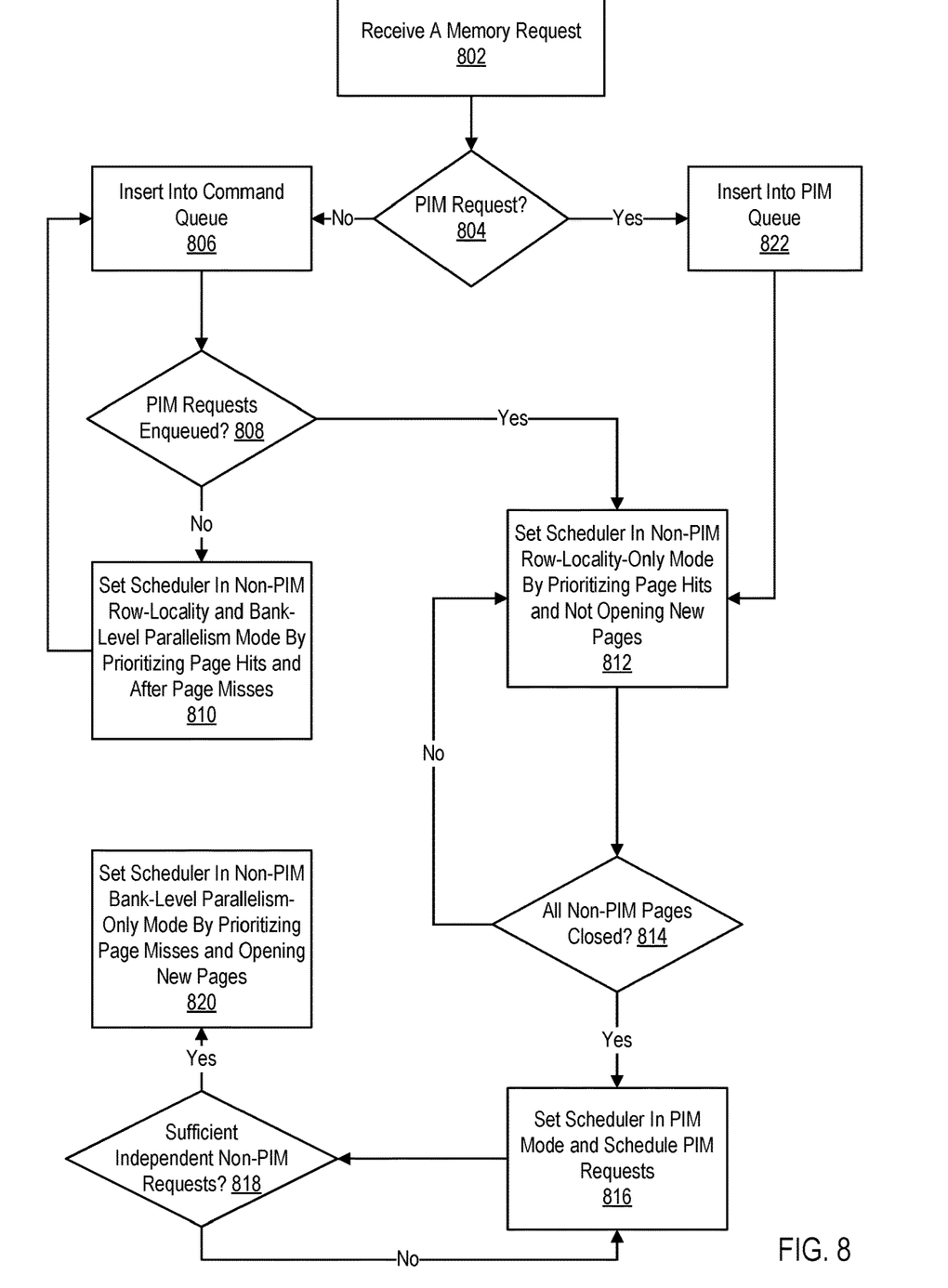
FIG. 8 sets forth a flow chart illustrating another example method for allocating resources when processing at memory level according to some implementations of the present disclosure.

FIG. 8 sets forth a flow chart illustrating another example method for allocating resources when processing at memory level according to some implementations of the present disclosure. The method of FIG. 8, in some implementations, is carried out by the example scheduling unit 600 of FIG. 6 within a memory controller. Steps described in the method of FIG. 8 will make reference to components of depicted in FIG. 6.

The method of FIG. 8 includes receiving 802 a memory request and determining 804 whether the request is a PIM request or a non-PIM request. If the memory request is not a PIM request, the method continues by inserting 806 the memory request into the command queue 602. The method further includes determining 808 if any PIM requests are queued in PIM queue 604. If no PIM requests are queued, the method continues by setting 810 the scheduler in a non-PIM, row-locality and bank-level parallelism mode that prioritizes scheduling non-PIM requests that result in page hits and after-page misses. The method then returns to determining 808 if any PIM requests are queued.

If PIM requests are queued, the scheduler is set 812 in a non-PIM, row-locality-only mode that prioritizes scheduling non-PIM requests that result in page hits and not opening new pages. The method then determines 814 if all non-PIM pages have been closed. If all non-PIM pages have not been closed, the scheduler remains in the non-PIM, row-locality-only mode. Once all non-PIM pages have been closed, the scheduler is set 816 in PIM mode and proceeds to schedule PIM requests.

While in PIM mode, the method includes determining 818 if there are sufficient independent non-PIM requests in the command queue 602. If there are not sufficient independent non-PIM requests, the scheduler is set 816 in the PIM mode. If there are sufficient independent non-PIM requests, the scheduler is set 820 in the non-PIM, bank-level parallelism-only mode that prioritizes scheduling non-PIM requests that result in page misses and opening new pages.

The steps described above are carried out when a non-PIM request is received. If the memory request is a PIM request, the PIM request is inserted 822 into the PIM queue 604. Additionally, the scheduler is set 812 in the non-PIM Row-Locality-Only Mode until all non-PIM pages are closed. Then the scheduler is set 816 in PIM mode and proceeds to schedule PIM requests.

In an implementation, the method of FIG. 8 is performed independently of the implementations described with respect to FIGS. 2-4 and the efficient scheduling of memory requests is carried out solely based on the switching cost aware techniques of FIG. 8. In implementations, the method of FIG. 8 is integrated with the implementations described with respect to FIGS. 2-4. In such implementations, the techniques set forth in FIG. 5 also incorporate the switching cost aware techniques of FIG. 8.

Implementations can be a system, an apparatus, a method, and/or logic. Computer readable program instructions in the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In some implementations, electronic circuitry including, for example, programmable logic circuitry, field-programmable gate arrays (FPGA), or programmable logic arrays (PLA) can execute the computer readable program instructions by utilizing state information of the computer readable program instructions.

Aspects of the present disclosure are described herein with reference to flowchart illustrations and/or block diagrams of methods, apparatus (systems), and logic circuitry according to some implementations of the disclosure. It will be understood that each block of the flowchart illustrations and/or block diagrams, and combinations of blocks in the flowchart illustrations and/or block diagrams, can be implemented by logic circuitry.

The logic circuitry can be implemented in a processor, other programmable data processing apparatus, or other device to cause a series of operational steps to be performed on the processor, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and logic circuitry according to various implementations of the present disclosure. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

While the present disclosure has been particularly shown and described with reference to implementations thereof, it will be understood that various changes in form and details can be made therein without departing from the spirit and scope of the following claims. Therefore, the implementations described herein should be considered in a descriptive sense only and not for purposes of limitation. The present disclosure is defined not by the detailed description but by the appended claims, and all differences within the scope will be construed as being included in the present disclosure.

What is claimed is:

1. An apparatus for efficient resource allocation through memory request scheduling, the apparatus comprising:
a memory controller to receive a first memory request having a first request type and a second memory request having a second request type; and
a scheduling unit to schedule an execution order of the first and second memory requests based upon a first parameter value and a second parameter value, wherein the first parameter value and the second parameter value are based on a ratio of utility and energy cost for the first request and the second request respectively.

2. The apparatus of claim 1, wherein the first parameter value corresponds to a utility and energy cost for the first memory request and the second parameter value corresponds to a utility and energy cost for the second memory request.

3. The apparatus of claim 1, wherein the first request type is a processing-in-memory (PIM) request type and the second request type is a non-PIM request type.

4. The apparatus of claim 1, wherein the scheduling unit comprises a utility estimation unit, an energy cost unit, and an arbiter, and wherein the first parameter value is based on a ratio of a first utility value and a first energy cost value, and wherein the second parameter value is based on a ratio of a second utility value and a second energy cost value.

5. The apparatus of claim 4, wherein the first utility value is calculated based on at least one of the first request type, a number of banks accessed by the first memory request, a memory bandwidth utilization associated with the first memory request, a cache utilization associated with the first memory request, and an interconnect utilization associated with the first memory request.

6. The apparatus of claim 4, wherein the first energy cost value is calculated based on at least one of the first request type, a number of banks accessed by the first memory request, a page state of a memory accessed by the first memory request, a number of open rows associated with the first memory request, and a number of closed rows associated with the first memory request.

7. The apparatus of claim 4, wherein the scheduling unit is further configured to store the first utility value and the second utility value in a utility history.

8. The apparatus of claim 7, wherein the first utility value is stored in the utility history in association with a first thread identifier associated with the first memory request, and the second utility value is stored in the utility history in association with a second thread identifier associated with the second memory request.

9. The apparatus of claim 4, wherein the scheduling unit is further configured to store the first energy cost value and the second energy cost value in an energy history.

10. The apparatus of claim 9, wherein the first energy cost value is stored in the energy history in association with a first thread identifier associated with the first memory request, and the second energy cost value is stored in the energy history in association with a second thread identifier associated with the second memory request.

11. The apparatus of claim 9, wherein the scheduling unit is further configured to schedule the first memory request before the second memory request for execution based upon the first parameter value being greater than or equal to the second parameter value.

12. The apparatus of claim 1, wherein the scheduling unit is further configured to schedule the first memory request and the second memory request for concurrent execution based upon the first memory request not accessing a row.

13. The apparatus of claim 1, wherein the scheduling unit is further configured to calculate a switching cost associated with one of switching from: scheduling a memory request of the first request type to scheduling a memory request of the second request type, or scheduling a memory request of the second request type to scheduling a memory request of the first request type.

14. A method for allocating resources when processing at memory level, the method comprising:
receiving a first memory request having a first request type and a second memory request having a second request type; and
scheduling an order of the first memory request and the second memory request for execution based upon a first parameter value and a second parameter value, wherein the first parameter value and the second parameter value are based on a ratio of utility and energy cost for the first request and the second request respectively.

15. The method of claim 14, wherein scheduling the order comprises one of:
scheduling the first memory request before the second memory request for execution based upon the first parameter value being greater than or equal to the second parameter value; and
scheduling the second memory request before the first memory request for execution based upon the second parameter value being greater than the first parameter value.

16. The method of claim 14, further comprising calculating a switching cost associated with one of switching from: scheduling a memory request of the first request type to scheduling a memory request of the second request type, or scheduling a memory request of the second request type to scheduling a memory request of the first request type, wherein the first parameter value is based on a ratio of a first utility value and a first energy cost value, and wherein the second parameter value is based on a ratio of a second utility value and a second energy cost value.

17. The method of claim 16, wherein the first utility value is calculated based on at least one of the first request type, a number of banks accessed by the first memory request, a memory bandwidth utilization associated with the first memory request, a cache utilization associated with the first memory request, and an interconnect utilization associated with the first memory request.

18. The method of claim 16, wherein the first energy cost value is calculated based on at least one of the first request type, a number of banks accessed by the first memory request, a page state of a memory accessed by the first memory request, a number of open rows associated with the first memory request, and a number of closed rows associated with the first memory request.

19. The method of claim 14, wherein the first request type is a processing-in-memory (PIM) request type and the second request type is a non-PIM request type.

20. The method of claim 14, wherein scheduling the order comprises scheduling the first memory request and the second memory request for concurrent execution based upon the first memory request not accessing a row.

* * * * *